United States Patent
Muto

(10) Patent No.: US 9,627,986 B2
(45) Date of Patent: Apr. 18, 2017

(54) POWER CONVERSION DEVICE AND POWER CONVERSION METHOD

(71) Applicant: Toyota Jidosha Kabushiki Kaisha, Toyota-shi, Aichi-ken (JP)

(72) Inventor: Jun Muto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 31 days.

(21) Appl. No.: 14/680,317

(22) Filed: Apr. 7, 2015

(65) Prior Publication Data

US 2015/0295503 A1 Oct. 15, 2015

(30) Foreign Application Priority Data

Apr. 10, 2014 (JP) ................. 2014-081405

(51) Int. Cl.
*H02M 3/335* (2006.01)
*H02M 1/00* (2006.01)

(52) U.S. Cl.
CPC ..... *H02M 3/33584* (2013.01); *H02M 3/3353* (2013.01); *H02M 3/33561* (2013.01); *H02M 2001/0064* (2013.01)

(58) Field of Classification Search
CPC ....... H02M 3/33576; H02M 2001/325; H02M 3/33523; H02J 9/04; Y10T 307/625
USPC ............. 363/16–17, 21.02, 21.04, 21.09, 49; 307/62–66
See application file for complete search history.

(56) References Cited

U.S. PATENT DOCUMENTS

| | | | | |
|---|---|---|---|---|
| 7,733,072 B2* | 6/2010 | Kanakubo | ........... | H02M 3/1582 323/222 |
| 8,237,417 B2* | 8/2012 | Miyamae | ............ | H02M 3/1582 323/259 |
| 8,410,767 B2* | 4/2013 | Miyamae | .............. | H02M 3/156 323/243 |
| 8,638,082 B2* | 1/2014 | Miyamae | ............ | H02M 3/1582 323/284 |
| 8,829,713 B2* | 9/2014 | Ishigaki | .................. | B60R 25/00 307/66 |

(Continued)

FOREIGN PATENT DOCUMENTS

| CN | 102638184 A | 8/2012 |
|---|---|---|
| JP | 11187662 A | 7/1999 |

(Continued)

*Primary Examiner* — Rajnikant Patel
(74) *Attorney, Agent, or Firm* — Dinsmore & Shohl LLP

(57) ABSTRACT

A power conversion method of a power conversion device including a primary side port disposed in a primary side circuit and a secondary side port disposed in a secondary side circuit magnetically coupled to the primary side circuit with a transformer, the power conversion device adjusting transmission power transmitted between the primary side circuit and the secondary side circuit by changing a phase difference between switching of the primary side circuit and switching of the secondary side circuit, and changing a voltage of the secondary side port by a DC-DC converter connected to the secondary side port, the power conversion method including: monitoring a voltage ratio of a voltage of the primary side port and the voltage of the secondary side port; and causing the DC-DC converter to operate when the voltage ratio deviates from the reference value by the specified value or more.

8 Claims, 7 Drawing Sheets

(56) References Cited

U.S. PATENT DOCUMENTS

| | | | |
|---|---|---|---|
| 9,130,464 B2* | 9/2015 | Ho | H02M 3/33507 |
| 2004/0062066 A1* | 4/2004 | Crocker | H02M 3/33584 |
| | | | 363/131 |
| 2011/0198933 A1 | 8/2011 | Ishigaki et al. | |

FOREIGN PATENT DOCUMENTS

| | | |
|---|---|---|
| JP | 2006081263 A | 3/2006 |
| JP | 2008289326 A | 11/2008 |
| JP | 2010-088152 A | 4/2010 |
| JP | 2011-193713 A | 9/2011 |
| JP | 2012-186970 A | 9/2012 |

\* cited by examiner

DECREASE IN TRANSMISSION POWER

VOLTAGE RATIO IS NORMAL

VOLTAGE RATIO DEVIATES

INCREASE IN PEAK CURRENT

VOLTAGE RATIO IS NORMAL

VOLTAGE RATIO DEVIATES

POWER CONVERSION DEVICE AND POWER CONVERSION METHOD

INCORPORATION BY REFERENCE

The disclosure of Japanese Patent Application No. 2014-081405 filed on Apr. 10, 2014 including the specification, drawings and abstract is incorporated herein by reference in its entirety.

BACKGROUND OF THE INVENTION

1. Field of the Invention

The present invention relates to a power conversion device and a power conversion method.

2. Description of Related Art

A power conversion device is known which adjusts transmission power transmitted between a primary side conversion circuit including a primary side port and a secondary side conversion circuit including a secondary side port and being magnetically coupled to the primary side conversion circuit with a transformer depending on a phase difference φ (for example, see Japanese Patent Application Publication No. 2011-193713 (JP 2011-193713 A)).

In the power conversion device as described above, it is assumed that a voltage ratio of a voltage of the primary side port and a voltage of the secondary side port is constant (reference value).

However, for example, when the secondary side port is connected to a high voltage battery of a hybrid vehicle, the voltage of the secondary side port varies significantly (±50V or more). Since the voltage ratio deviates from the reference value, there is a possibility that the transmission power decreases.

SUMMARY OF THE INVENTION

Therefore, an aspect of the invention provides for suppressing a decrease in transmission power.

According to an aspect of the invention, there is provided a power conversion method of a power conversion device including a primary side port disposed in a primary side circuit and a secondary side port disposed in a secondary side circuit magnetically coupled to the primary side circuit with a transformer, the power conversion device adjusting transmission power transmitted between the primary side circuit and the secondary side circuit by changing a phase difference between switching of the primary side circuit and switching of the secondary side circuit, and changing a voltage of the secondary side port by a DC-DC converter that is connected to the secondary side port, the power conversion method including: monitoring a voltage ratio of a voltage of the primary side port and the voltage of the secondary side port; determining whether the voltage ratio deviates from a reference value by a specified value or more; and causing the DC-DC converter to operate when the voltage ratio deviates from the reference value by the specified value or more.

According to the aspect of the invention, it is possible to suppress the decrease in the transmission power.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Device 101>

Figure 1:
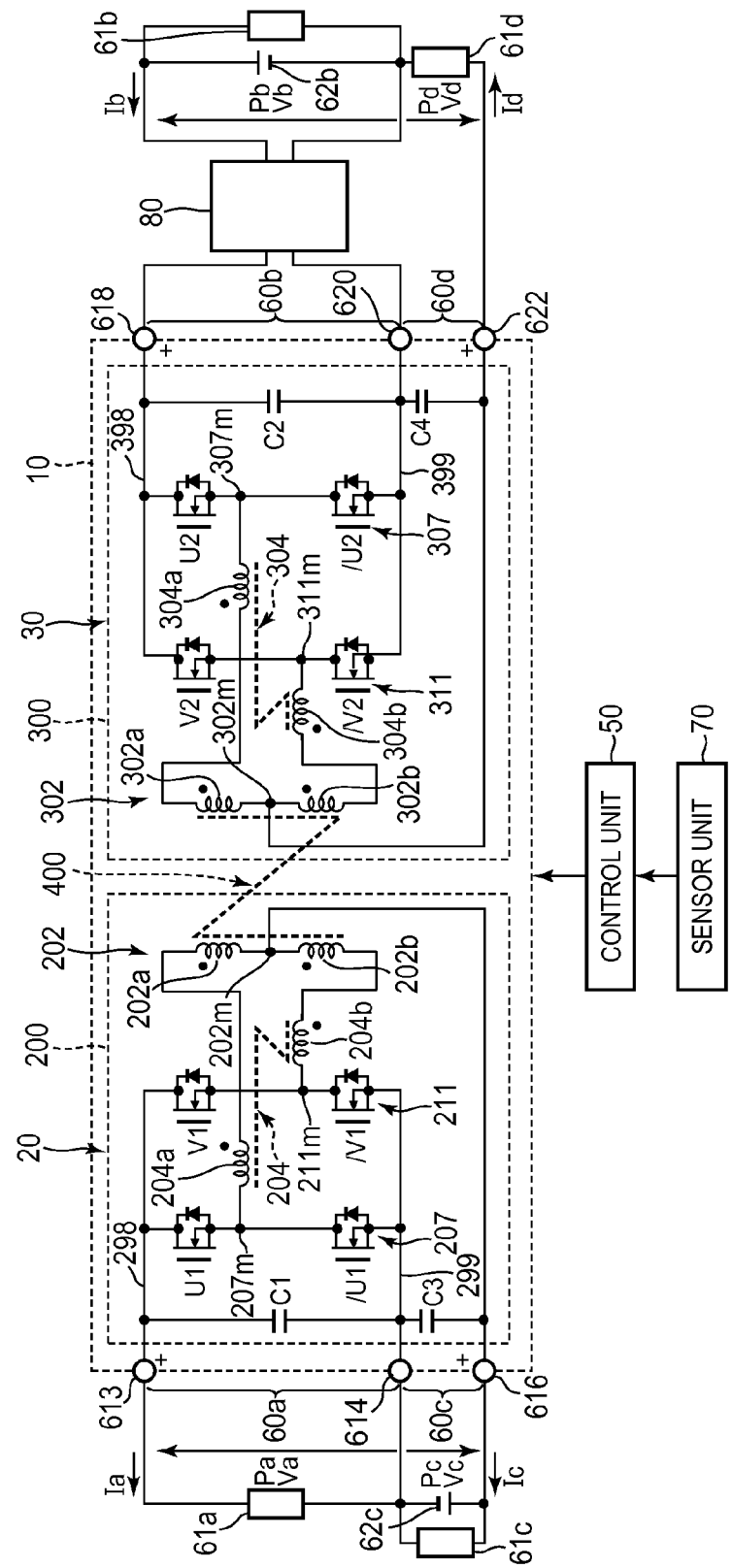
FIG. 1 is a block diagram illustrating a configuration example of a power supply device as an embodiment of a power conversion device.

FIG. 1 is a block diagram illustrating a configuration example of a power supply device 101 as an embodiment of a power conversion device. The power supply device 101 is, for example, a power supply system including a power supply circuit 10, a control unit 50, a sensor unit 70, and a step-up/down DC-DC converter 80. The power supply device 101 is a system that is mounted on a vehicle such as an automobile and that distributes power to in-vehicle loads. Specific examples of the vehicle include a hybrid vehicle, a plug-in hybrid vehicle, and an electric automobile.

For example, the power supply device 101 includes a first input/output port 60a connected to a primary side high voltage system load (for example, an electric power steering device (EPS)) 61a and a second input/output port 60c connected to a primary side low voltage system load (for example, an electronic control unit (ECU) and an electronic control brake system (ECB)) 61c and a primary side low voltage system power supply (for example, an auxiliary battery) 62c as primary side ports. The primary side low voltage system power supply 62c supplies power to the primary side low voltage system load 61c operating in the same voltage system (for example, 12 V system) as the primary side low voltage system power supply 62c. Further, the primary side low voltage system power supply 62c supplies power, which has been stepped up by a primary side conversion circuit 20 disposed in the power supply circuit 10, to the primary side high voltage system load 61a operating in a voltage system (for example, 48 V system higher than the 12 V system) different from the primary side low voltage system power supply 62c. A specific example of the primary side low voltage system power supply 62c is a secondary battery such as a lead battery.

The power supply device 101 includes a third input/output port 60b connected to the step-up/down DC-DC converter 80, a secondary side high voltage system load 61b and a secondary side high voltage system power supply (for example, a main battery) 62b and a fourth input/output port 60d connected to a secondary side low voltage system load 61d as secondary side ports. The secondary side high voltage system power supply 62b supplies power to the secondary side high voltage system load 61b operating in the same voltage system (for example, 288 V system higher than the 12 V system and the 48 V system) as the secondary side high voltage system power supply 62b. The secondary side high voltage system power supply 62b supplies power, which has been stepped down by a secondary side conversion circuit 30 disposed in the power supply circuit 10, to the secondary side low voltage system load 61d operating in a voltage system (for example, 72 V system lower than the 288 V system) different from the secondary side high voltage system power supply 62b. A specific example of the secondary side high voltage system power supply 62b is a secondary battery such as a lithium ion battery.

The power supply circuit 10 is a power conversion circuit that includes the aforementioned four input/output ports and that has a function of selecting two input/output ports out of the four input/output ports and performing power conversion between the selected two input/output ports. The power supply device 101 including the power supply circuit 10 may be a device that includes three or more input/output ports and that can convert power between two input/output ports out of the three or more input/output ports. For example, the power supply circuit 10 may be, for example, a circuit that includes three input/output ports other than the fourth input/output port 60d.

Port power Pa, Pc, Pb, Pd are input/output power (input power or output power) at the first input/output port 60a, the second input/output port 60c, the third input/output port 60b, and the fourth input/output port 60d. Port voltages Va, Vc, Vb, Vd are input/output voltages (an input voltage or an output voltage) at the first input/output port 60a, the second input/output port 60c, the third input/output port 60b, and the fourth input/output port 60d. Port currents Ia, Ic, Ib, Id are input/output currents (an input current or an output current) at the first input/output port 60a, the second input/output port 60c, the third input/output port 60b, and the fourth input/output port 60d.

The power supply circuit 10 includes a capacitor C1 disposed at the first input/output port 60a, a capacitor C3 disposed at the second input/output port 60c, a capacitor C2 disposed at the third input/output port 60b, and a capacitor C4 disposed at the fourth input/output port 60d. Specific examples of the capacitors C1, C2, C3, C4 include a film capacitor, an aluminum electrolytic capacitor, a ceramic capacitor, and a solid polymer capacitor.

The capacitor C1 is inserted between a high potential terminal 613 of the first input/output port 60a and a low potential terminal 614 of the first input/output port 60a and the second input/output port 60c. The capacitor C3 is inserted between a high potential terminal 616 of the second input/output port 60c and the low potential terminal 614 of the first input/output port 60a and the second input/output port 60c. The capacitor C2 is inserted between a high potential terminal 618 of the third input/output port 60b and a low potential terminal 620 of the third input/output port 60b and the fourth input/output port 60d. The capacitor C4 is inserted between a high potential terminal 622 of the fourth input/output port 60d and the low potential terminal 620 of the third input/output port 60b and the fourth input/output port 60d.

The capacitors C1, C2, C3, C4 may be disposed inside the power supply circuit 10 or may be disposed outside the power supply circuit 10.

The power supply circuit 10 is a power conversion circuit including the primary side conversion circuit 20 and the secondary side conversion circuit 30. The primary side conversion circuit 20 and the secondary side conversion circuit 30 are connected to each other via a primary side magnetic coupling reactor 204 and a secondary side magnetic coupling reactor 304 and are magnetically coupled with a transformer 400 (center-tap transformer). The primary side ports including the first input/output port 60a and the second input/output port 60c and the secondary side ports including the third input/output port 60b and the fourth input/output port 60d are connected to each other via the transformer 400.

The primary side conversion circuit 20 is a primary side circuit including a primary side full bridge circuit 200, the first input/output port 60a, and the second input/output port 60c. The primary side full bridge circuit 200 is a primary side power conversion unit including a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are, for example, switching elements including an N-channel MOSFET and a body diode as a parasitic element of the MOSFET. A diode may be additionally connected in parallel to the MOSFET.

The primary side full bridge circuit 200 includes a primary side positive electrode bus line 298 connected to the high potential terminal 613 of the first input/output ports 60a and a primary side negative electrode bus line 299 connected to the low potential terminal 614 of the first input/output port 60a and the second input/output port 60c.

A primary side first arm circuit 207 in which the primary side first upper arm U1 and the primary side first lower arm /U1 are connected in series is disposed between the primary side positive electrode bus line 298 and the primary side negative electrode bus line 299. The primary side first arm circuit 207 is a primary side first power conversion circuit unit (primary side U-phase power conversion circuit unit) that can perform a power conversion operation by ON/OFF switching operations of the primary side first upper arm U1 and the primary side first lower arm /U1. A primary side second arm circuit 211 in which the primary side second upper arm V1 and the primary side second lower arm /V1 are connected in series is disposed in parallel to the primary side first arm circuit 207 between the primary side positive electrode bus line 298 and the primary side negative electrode bus line 299. The primary side second arm circuit 211 is a primary side second power conversion circuit unit (primary side V-phase power conversion circuit unit) that can perform a power conversion operation by ON/OFF switching operations of the primary side second upper arm V1 and the primary side second lower arm /V1.

A bridge part connecting a midpoint 207m of the primary side first arm circuit 207 and a midpoint 211m of the primary side second arm circuit 211 is provided with the primary side coil 202 and the primary side magnetic coupling reactor 204. The connection relationship of the bridge part will be described below in more detail. The midpoint 207m of the primary side first arm circuit 207 is connected to one end of a primary side first reactor 204a of the primary side magnetic coupling reactor 204. The other end of the primary side first reactor 204a is connected to one end of the primary side coil 202. The other end of the primary side coil 202 is connected to one end of a primary side second reactor 204b of the primary side magnetic coupling reactor 204. The other end of the primary side second reactor 204b is connected to the midpoint 211m of the primary side second arm circuit 211. The primary side magnetic coupling reactor 204 includes the primary side first reactor 204a and the primary side second reactor 204b magnetically coupled to the primary side first reactor 204a with a coupling coefficient k1.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port disposed between the primary side positive electrode bus line 298 and the primary side negative electrode bus line 299. The first input/output port 60a includes the terminal 613 and the terminal 614. The second input/output port 60c is a port disposed between the primary side negative electrode bus line 299 and the center tap 202m of the primary side coil 202. The second input/output port 60c includes the terminal 614 and the terminal 616.

The port voltage Va of the first input/output port 60a and the port voltage Vc of the second input/output port 60c vary depending on the voltage of the primary side low voltage system power supply 62c.

The center tap 202m is connected to the high potential terminal 616 of the second input/output port 60c. The center tap 202m is an intermediate connecting point between a primary side first winding 202a and a primary side second winding 202b disposed in the primary side coil 202.

The secondary side conversion circuit 30 is a secondary side circuit including a secondary side full bridge circuit 300, the third input/output port 60b, and the fourth input/output port 60d. The secondary side full bridge circuit 300 is a secondary side power conversion unit including a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are, for example, switching elements including an N-channel MOSFET and a body diode as a parasitic element of the MOSFET. A diode may be additionally connected in parallel to the MOSFET.

The secondary side full bridge circuit 300 includes a secondary side positive electrode bus line 398 connected to the high potential terminal 618 of the third input/output ports 60b and a secondary side negative electrode bus line 399 connected to the low potential terminal 620 of the third input/output port 60b and the fourth input/output port 60d.

A secondary side first arm circuit 307 in which the secondary side first upper arm U2 and the secondary side first lower arm /U2 are connected in series is disposed between the secondary side positive electrode bus line 398 and the secondary side negative electrode bus line 399. The secondary side first arm circuit 307 is a secondary side first power conversion circuit unit (secondary side U-phase power conversion circuit unit) that can perform a power conversion operation by ON/OFF switching operations of the secondary side first upper arm U2 and the secondary side first lower arm /U2. A secondary side second arm circuit 311 in which the secondary side second upper arm V2 and the secondary side second lower arm /V2 are connected in series is disposed in parallel to the secondary side first arm circuit 307 between the secondary side positive electrode bus line 398 and the secondary side negative electrode bus line 399. The secondary side second arm circuit 311 is a secondary side second power conversion circuit unit (secondary side V-phase power conversion circuit unit) that can perform a power conversion operation by ON/OFF switching operations of the secondary side second upper arm V2 and the secondary side second lower arm /V2.

A bridge part connecting a midpoint 307m of the secondary side first arm circuit 307 and a midpoint 311m of the secondary side second arm circuit 311 is provided with the secondary side coil 302 and the secondary side magnetic coupling reactor 304.

The connection relationship of the bridge part will be described below in more detail. The midpoint 307m of the secondary side first arm circuit 307 is connected to one end of a secondary side first reactor 304a of the secondary side magnetic coupling reactor 304. The other end of the secondary side first reactor 304a is connected to one end of the secondary side coil 302. The other end of the secondary side coil 302 is connected to one end of a secondary side second reactor 304b of the secondary side magnetic coupling reactor 304. The other end of the secondary side second reactor 304b is connected to the midpoint 311m of the secondary side second arm circuit 311. The secondary side magnetic coupling reactor 304 includes the secondary side first reactor 304a and the secondary side second reactor 304b magnetically coupled to the secondary side first reactor 304a with a coupling coefficient k2.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port disposed between the secondary side positive electrode bus line 398 and the secondary side negative electrode bus line 399. The third input/output port 60b includes the terminal 618 and the terminal 620. The fourth input/output port 60d is a port disposed between the secondary side negative electrode bus line 399 and the center tap 302m of the secondary side coil 302. The fourth input/output port 60d includes the terminal 620 and the terminal 622.

The port voltage Vb of the third input/output port 60a and the port voltage Vd of the fourth input/output port 60d vary depending on the voltage of the secondary side low voltage system power supply 62b.

The center tap 302m is connected to the high potential terminal 622 of the fourth input/output port 60d. The center tap 302m is an intermediate connecting point between a secondary side first winding 302a and a secondary side second winding 302b disposed in the secondary side coil 302.

In FIG. 1, the power supply device 101 includes a sensor unit 70. The sensor unit 70 is a detection unit that detects an input/output value Y at at least one of the first to fourth input/output ports 60a, 60c, 60b, 60d with a predetermined detection cycle and that outputs a detected value Yd corresponding to the detected input/output value Y to the control unit 50. The detected value Yd may be a detected voltage obtained by detecting an input/output voltage, a detected current obtained by detecting an input/output current, or may be detected power obtained by detecting input/output power. The sensor unit 70 may be disposed inside the power supply circuit 10 or may be disposed outside the power supply circuit 10.

The sensor unit 70 includes, for example, a voltage detecting unit that detects an input/output voltage generated in at least one port of the first to fourth input/output ports 60a, 60c, 60b, 60d. The sensor unit 70 includes, for example, a primary side voltage detecting unit that outputs the detected voltage of at least one of the input output voltage Va and the input/output voltage Vc as a primary side detected voltage value and a secondary side voltage detecting unit that outputs the detected voltage of at least one of the input/output voltage Vb and the input/output voltage Vd as a secondary side detected voltage value.

The voltage detecting unit of the sensor unit 70 includes, for example, a voltage sensor that monitors the input/output voltage value of at least one port and a voltage detection circuit that outputs a detected voltage corresponding to the input/output voltage value monitored by the voltage sensor to the control unit 50.

The sensor unit 70 includes, for example, a current detecting unit that detects an input/output current flowing in at least one port of the first to fourth input/output ports 60a, 60c, 60b, 60d. The sensor unit 70 includes a primary side current detecting unit that outputs the detected current of at least one of the input/output current Ia and the input/output current Ic as a primary side detected current value and a secondary side current detecting unit that outputs the detected current of at least one of the input/output current Ib and the input/output current Id as a secondary side detected current value.

The current detecting unit of the sensor unit 70 includes, for example, a current sensor that monitors the input/output current value of at least one port and a current detection circuit that outputs a detected current corresponding to the input/output current value monitored by the current sensor to the control unit 50.

In FIG. 1, the power supply device 101 includes the step-up/down DC-DC converter 80.

The step-up/down DC-DC converter 80 operates when a voltage ratio M between the input/output voltage of the first input/output port 60a (port voltage Va) and the input/output voltage of the third input/output port 60b (port voltage Vb) deviates from a reference value by a specified value or more. Further, the step-up/down DC-DC converter 80 does not operate when the voltage ratio M does not deviate from the reference value by the specified value or more. That is, the step-up/down DC-DC converter 80 operates or does not operate based on the voltage ratio M.

Note that, the reference value represents a voltage ratio (=N) when the port voltage Va and the port voltage Vb are balanced (port voltage Va:port voltage Vb=1: N (N is a turns ratio of the transformer 400)) and desired power is transmitted between the primary side conversion circuit 20 and the secondary side conversion circuit 30. Further, the specified value represents a limit value that allows the voltage ratio M to deviate from the reference value (=N) while the power that is transmitted between the primary side conversion circuit 20 and the secondary side conversion circuit 30 does not decrease.

For example, when the voltage ratio M satisfies the reference value±the specified value ((the reference value− the specified value)<the voltage ratio M<(the reference value+the specified value)), since the port voltage Vb holds a value within a specified range, the transmission power does not decrease. For example, when the voltage ratio M deviates by the specified value or more (the voltage ratio M≤(the reference value−the specified value), or (the reference value+the specified value)≤the voltage ratio M), since the port voltage Vb does not hold a value within the specified range, the transmission power decreases.

The power supply device 101 includes the control unit 50. The control unit 50 is, for example, an electronic circuit including a micro computer having a CPU built therein. The control unit 50 may be disposed inside the power supply circuit 10 or may be disposed outside the power supply circuit 10.

The control unit 50 controls the power conversion operation performed by the power supply circuit 10 in a feedback manner by changing the value of a predetermined control parameter X, and can adjust the input/output values Y at the first to fourth input/output ports 60a, 60c, 60b, 60d of the power supply circuit 10. Examples of the main control parameter X include two types of control parameters of a phase difference φ and a duty ratio D (on-time δ).

The phase difference φ is a difference in switching timing (time lag) between the power conversion circuit units of the same phase in the primary side full bridge circuit 200 and the secondary side full bridge circuit 300. The duty ratio (on-time δ) is a duty ratio (on-time) of a switching waveform in the power conversion circuit units in the primary side full bridge circuit 200 and the secondary side full bridge circuit 300.

These two control parameters X can be controlled independently of each other. The control unit 50 changes the input/output values Y at the input/output ports of the power supply circuit 10 by duty ratio control and/or phase control of the primary side full bridge circuit 200 and the secondary side full bridge circuit 300 using the phase difference φ and the duty ratio D (on-time δ).

The control unit 50 controls the power conversion operation of the power supply circuit 10 in a feedback manner so that the detected value Yd of the input/output value Y in at least one port of the first to fourth input/output ports 60a, 60c, 60b, 60d converges on a target value Yo set at the port. The target value Yo is a command value set by the control unit 50 or a predetermined device other than the control unit 50, for example, on the basis of drive conditions defined for each load (for example, the primary side low voltage system load 61c) connected to the respective input/output ports. The target value Yo serves as an output target value when electric power is output from the port, serves as an input target value when electric power is input to the port, and may be a target voltage value, may be a target current value, or may be a target power value.

Further, the control unit 50 controls the power conversion operation of the power supply circuit 10 in a feedback manner to change the phase difference φ so that transmission power P transmitted via the transformer 400 between the primary side conversion circuit 20 and the secondary side conversion circuit 30 converges on preset target transmission power. The transmission power is also referred to as an amount of power transmitted. The target transmission power is a command value set by the control unit 50 or a predetermined device other than the control unit 50, for example, on the basis of the difference between the detected value Yd and the target value Yo at a certain port.

The control unit 50 detects the port voltage Va and the port voltage Vb, monitors the voltage ratio M (ratio of the port voltage Va and the port voltage Vb), causes the step-up/down DC-DC converter 80 to operate or not to operate, and controls the transmission power transmitted between the primary side conversion circuit 20 and the secondary side conversion circuit 30.

For example, when the voltage ratio M deviates from the reference value by the specified value or more, the control unit 50 causes the step-up/down DC-DC converter 80 to operate. Moreover, the control unit 50 changes the port voltage Vb to make it hold a value within the specified range.

Thus, the power supply device 101 can keep the voltage ratio M substantially constant (a value in an allowable range: (the reference value−the specified value)<the voltage ratio M<(the reference value+the specified value)), to suppress a decrease in the power transmitted between the primary side conversion circuit 20 and the secondary side conversion circuit 30. In addition, the allowable range may be set arbitrarily for each power supply device 101.

Figure 2:
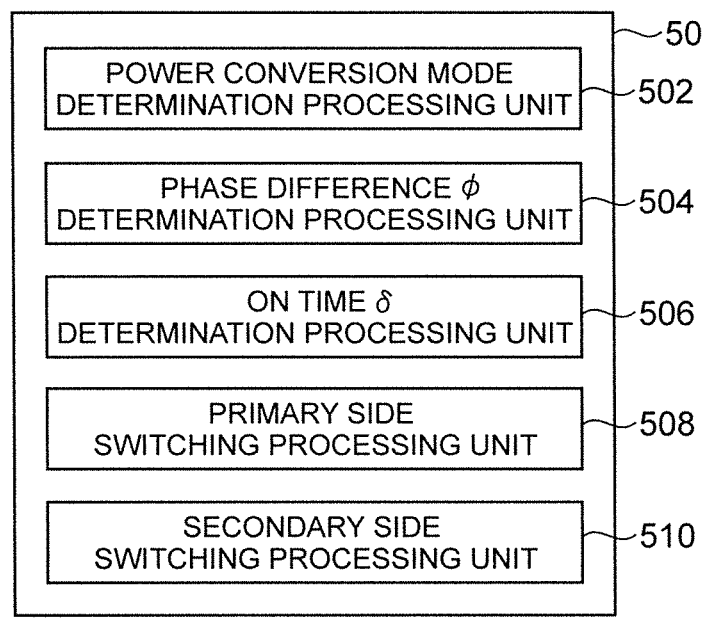
FIG. 2 is a block diagram illustrating a configuration example of a control unit.

FIG. 2 is a block diagram of the control unit 50. The control unit 50 is a control unit having a function of controlling switching of the switching elements such as the primary side first upper arm U1 of the primary side conversion circuit 20 and the switching elements such as the secondary side first upper arm U2 of the secondary side conversion circuit 30. The control unit 50 includes a power conversion mode determination processing unit 502, a phase difference φ determination processing unit 504, an on-time δ determination processing unit 506, a primary side switching processing unit 508, and a secondary side switching processing unit 510. The control unit 50 is, for example, an electronic circuit including a micro computer having a CPU built therein.

The power conversion mode determination processing unit 502 selects and determines an operation mode out of power conversion modes A to L, which will be described below, of the power supply circuit 10, for example, on the basis of a predetermined external signal (for example, a signal indicating a difference between the detected value Yd and the target value Yo at a certain port). The power conversion modes include mode A in which electric power input from the first input/output port 60a is converted and output to the second input/output port 60c, mode B in which electric power input from the first input/output port 60a is converted and output to the third input/output port 60b, and mode C in which electric power input from the first input/output port 60a is converted and output to the fourth input/output port 60d.

The power conversion modes include mode D in which electric power input from the second input/output port 60c is converted and output to the first input/output port 60a, mode E in which electric power input from the second input/output port 60c is converted and output to the third input/output port 60b, and mode F in which electric power input from the second input/output port 60c is converted and output to the fourth input/output port 60d.

The power conversion modes include mode G in which electric power input from the third input/output port 60b is converted and output to the first input/output port 60a, mode H in which electric power input from the third input/output port 60b is converted and output to the second input/output port 60c, and mode I in which electric power input from the third input/output port 60b is converted and output to the fourth input/output port 60d.

The power conversion modes include mode J in which electric power input from the fourth input/output port 60d is converted and output to the first input/output port 60a, mode K in which electric power input from the fourth input/output port 60d is converted and output to the second input/output port 60c, and mode L in which electric power input from the fourth input/output port 60d is converted and output to the third input/output port 60b.

The phase difference φ determination processing unit 504 has a function of setting the phase difference φ of periodic switching movement of the switching elements between the primary side conversion circuit 20 and the secondary side conversion circuit 30 so as to cause the power supply circuit 10 to serve as a DC-DC converter circuit.

The on-time δ determination processing unit 506 has a function of setting the on-time δ of the switching elements of the primary side conversion circuit 20 and the secondary side conversion circuit 30 so as to cause the primary side conversion circuit 20 and the secondary side conversion circuit 30 to serve as step-up/down circuits, respectively.

The primary side switching processing unit 508 has a function of controlling switching of the switching elements of the primary side first upper arm U1, the primary side first lower arm /U1, the primary side second upper arm V1, and the primary side second lower arm /V1 on the basis of the outputs of the power conversion mode determination processing unit 502, the phase difference φ determination processing unit 504, and the on-time δ determination processing unit 506.

The secondary side switching processing unit 510 has a function of controlling switching of the switching elements of the secondary side first upper arm U2, the secondary side first lower arm /U2, the secondary side second upper arm V2, and the secondary side second lower arm /V2 on the basis of the outputs of the power conversion mode determination processing unit 502, the phase difference φ determination processing unit 504, and the on-time δ determination processing unit 506.

The control unit 50 is not limited to the processes illustrated in FIG. 2 and can perform various processes required for controlling the transmission power transmitted between the primary side conversion circuit 20 and the secondary side conversion circuit 30.

<Operation of Power Supply Device 101>

The operation of the power supply device 101 will be described below with reference to FIGS. 1 and 2. For example, when an external signal for requiring for selecting mode F as the power conversion mode of the power supply circuit 10 is input, the power conversion mode determination processing unit 502 of the control unit 50 determines the power conversion mode of the power supply circuit 10 to be mode F. At this time, the voltage input to the second input/output port 60c is stepped up by the step-up function of the primary side conversion circuit 20, the power of the stepped-up voltage is transmitted to the third input/output port 60b by the function as the DC-DC converter circuit of the power supply circuit 10, the transmitted power is stepped down by the step-down function of the secondary side conversion circuit 30, and the stepped-down voltage is output from the fourth input/output port 60d.

The step-up/down function of the primary side conversion circuit 20 will be described below in detail. Paying attention to the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Since both ends of the primary side first arm circuit 207 are connected to the first input/output port 60a, a step-up/down circuit is disposed between the terminal 616 of the second input/output port 60c and the first input/output port 60a.

The terminal 616 of the second input/output port 60c is connected to the midpoint 211m of the primary side second arm circuit 211 via the primary side second winding 202b and the primary side second reactor 204b connected in series to the primary side second winding 202b. Since both ends of the primary side second arm circuit 211 are connected to the first input/output port 60a, a step-up/down circuit is disposed in parallel between the terminal 616 of the second input/output port 60c and the first input/output port 60a.

Since the secondary side conversion circuit 30 has substantially the same configuration as the primary side conversion circuit 20, two step-up/down circuits are connected in parallel between the terminal 622 of the fourth input/output port 60d and the third input/output port 60b. Accordingly, the secondary side conversion circuit 30 has a step-up/down function similarly to the primary side conversion circuit 20.

The function as the DC-DC converter circuit of the power supply circuit 10 will be described below in detail. Paying attention to the first input/output port 60a and the third input/output port 60b, the first input/output port 60a is connected to the primary side full bridge circuit 200 and the third input/output port 60b is connected to the secondary side full bridge circuit 300. The primary side coil 202 disposed in the bridge part of the primary side full bridge circuit 200 and the secondary side coil 302 disposed in the bridge part of the secondary side full bridge circuit 300 are magnetically coupled to each other with a coupling coefficient kT, whereby the transformer 400 serves as a center-tap transformer with a turns ratio of 1:N. Accordingly, by adjusting the phase difference φ, of the periodic switching movements of the switching elements of the primary side full bridge circuit 200 and the secondary side full bridge circuit 300, the electric power input to the first input/output port 60a can be converted and transmitted to the third input/output port 60b, or the electric power input to the third input/output port 60b can be converted and transmitted to the first input/output port 60a.

Figure 3:
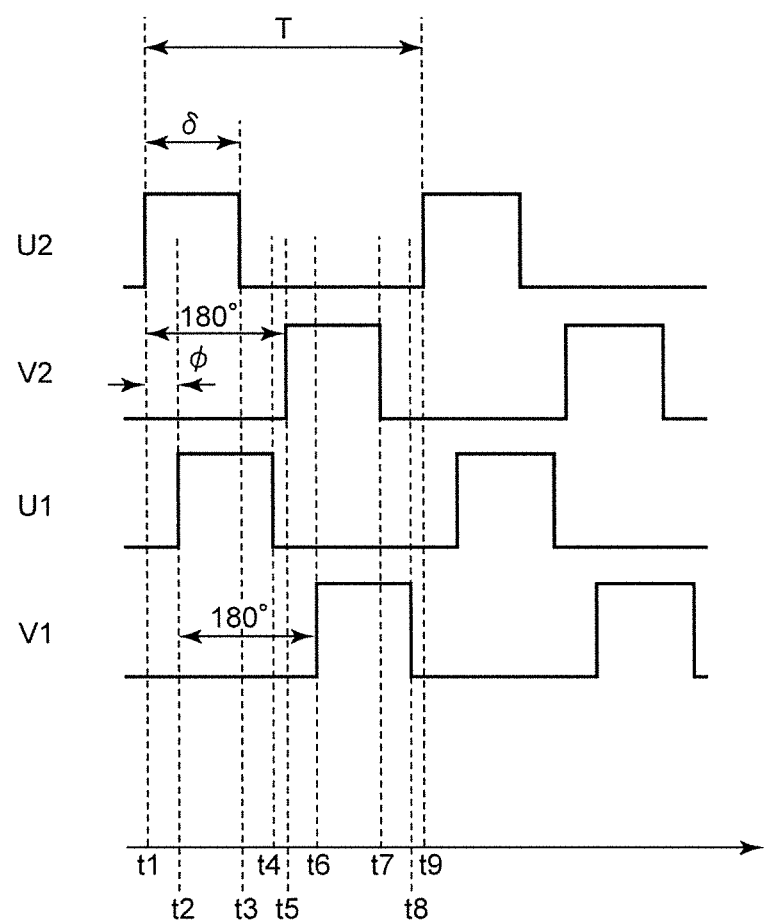
FIG. 3 is a timing diagram illustrating a switching example of a primary side circuit and a secondary side circuit.

FIG. 3 is a diagram illustrating ON-OFF switching waveforms of the arms disposed in the power supply circuit 10 under the control of the control unit 50. In FIG. 3, U1 represents the ON-OFF waveform of the primary side first upper arm U1, V1 represents the ON-OFF waveform of the primary side second upper arm V1, U2 represents the ON-OFF waveform of the secondary side first upper arm U2, and V2 represents the ON-OFF waveform of the secondary side second upper arm V2. The ON-OFF waveforms of the primary side first lower arm /U1, the primary side second lower arm /V1, the secondary side first lower arm /U2, and the secondary side second lower arm /V2 are waveforms (not illustrated) obtained by inverting the ON-OFF waveforms of the primary side first upper arm U1, the primary side second upper arm V1, the secondary side first upper arm U2, and the secondary side second upper arm V2, respectively. A dead time can be disposed between both ON and OFF waveforms of the upper and lower arms so that a penetration current does not flow at the time turning on both of the upper and lower arms. In FIG. 3, the high level represents the ON state and the low level represents the OFF state.

By changing the on-times δ of U1, V1, U2, V2, it is possible to change the step-up/down ratio of the primary side conversion circuit 20 and the secondary side conversion circuit 30. For example, by setting the on-times δ of the U1, V1, U2, V2 to be equal to each other, the step-up/down ratio of the primary side conversion circuit 20 and the step-up/down ratio of the secondary side conversion circuit 30 can be set to be equal to each other.

The on-time δ determination processing unit 506 sets the on-times δ of U1, V1, U2, V2 to be equal to each other so that the step-up/down ratios of the primary side conversion circuit 20 and the secondary side conversion circuit 30 are equal to each other (on-time δ=primary side on-time δ11=secondary side on-time δ12=time value β).

The step-up/down ratio of the primary side conversion circuit 20 is determined depending on the duty ratio D which is the ratio of the on-time δ to the switching period T of the switching element (arm) disposed in the primary side full bridge circuit 200. Similarly, the step-up/down ratio of the secondary side conversion circuit 30 is determined depending on the duty ratio D which is the ratio of the on-time δ to the switching period T of the switching element (arm) disposed in the secondary side full bridge circuit 300. The step-up/down ratio of the primary side conversion circuit 20 is a transformation ratio between the first input/output port 60a and the second input/output port 60c, and the step-up/down ratio of the secondary side conversion circuit 30 is a transformation ratio between the third input/output port 60b and the fourth input/output port 60d.

Accordingly, for example, step-up/down ratio of the primary side conversion circuit 20=voltage of the second input/output port 60c/voltage of the first input/output port 60a=δ11/T=βT and step-up/down ratio of the secondary side conversion circuit 30=voltage of the fourth input/output port 60d/voltage of the third input/output port 60b=δ12/T=βT are established. That is, the step-up/down ratio of the primary side conversion circuit 20 and the step-up/down ratio of the secondary side conversion circuit 30 have the same value (=β/T).

The on-time δ illustrated in FIG. 3 represents the on-time δ11 of the primary side first upper arm U1 and the primary side second upper arm V1, and represents the on-time δ12 of the secondary side first upper arm U2 and the secondary side second upper arm V2. The switching period T of the arm disposed in the primary side full bridge circuit 200 and the switching period T of the arm disposed in the secondary side full bridge circuit 300 are the same time.

The phase difference between U1 and V1 is set to 180 degrees (π) and the phase difference between U2 and V2 is set to 180 degrees (#). By changing the phase difference φ between U1 and U2, it is possible to adjust the amount of power transmitted P between the primary side conversion circuit 20 and the secondary side conversion circuit 30. The electric power can be transmitted from the primary side conversion circuit 20 to the secondary side conversion circuit 30 when the phase difference φ>0 is established, and the electric power can be transmitted from the secondary side conversion circuit 30 to the primary side conversion circuit 20 when the phase difference φ<0 is established.

The phase difference φ is a difference in switching timing (time lag) between the power conversion circuit units of the same phase in the primary side full bridge circuit 200 and the secondary side full bridge circuit 300. For example, the phase difference φ is a difference in switching timing between the primary side first arm circuit 207 and the secondary side first arm circuit 307, and is a difference in switching timing between the primary side second arm circuit 211 and the secondary side second arm circuit 311. The differences are controlled to the same state. That is, the phase difference φ between U1 and U2 and the phase difference φ between V1 and V2 are controlled to the same value.

Therefore, for example, when an external signal for requiring for selecting mode F as the power conversion mode of the power supply circuit 10 is input, the power conversion mode determination processing unit 502 determines that mode F is selected. The on-time δ determination processing unit 506 sets the on-time δ for defining the step-up ratio when the primary side conversion circuit 20 is caused to serve as a step-up circuit stepping up the voltage input to the second input/output port 60c and outputs the stepped-up voltage to the first input/output port 60a. The secondary side conversion circuit 30 serves as a step-down circuit stepping down the voltage input to the third input/ output port 60b at the step-down ratio defined by the on-time δ set by the on-time δ determination processing unit 506 and outputting the stepped-down voltage to the fourth input/output port 60d. The phase difference φ determination processing unit 504 sets the phase difference φ for transmitting the electric power input to the first input/output port 60a to the third input/output port 60b by a desired amount of power transmitted P.

The primary side switching processing unit 508 controls the switching of the switching elements of the primary side first upper arm U1, the primary side first lower arm /U1, the primary side second upper arm V1, and the primary side second lower arm /V1 so that the primary side conversion circuit 20 serves as a step-up circuit and the primary side conversion circuit 20 serves as a part of the DC-DC converter circuit.

The secondary side switching processing unit 510 controls the switching of the switching elements of the secondary side first upper arm U2, the secondary side first lower arm /U2, the secondary side second upper arm V2, and the secondary side second lower arm /V2 so that the secondary side conversion circuit 30 serves as a step-down circuit and the secondary side conversion circuit 30 serves as a part of the DC-DC converter circuit.

As described above, the primary side conversion circuit 20 and the secondary side conversion circuit 30 can serve as a step-up circuit or a step-down circuit and the power supply circuit 10 can serve as a bidirectional DC-DC converter circuit. Accordingly, the power conversion can be performed in all the power conversion modes A to L, that is, the power conversion can be performed between two selected input/output ports out of four input/output ports.

The transmission power P (also referred to as amount of power transmitted P) adjusted depending on the phase difference φ, equivalent inductance L, and the like by the control unit 50 is electric power transmitted from one conversion circuit of the primary side conversion circuit 20 and the secondary side conversion circuit 30 to the other conversion circuit via the transformer 400, and is expressed by Expression (1), $P=(N \times Va \times Vb)/(\pi \times \omega \times L) \times F(D, \phi)$.

Here, N represents the turns ratio of the transformer 400, Va represents the input/output voltage of the first input/output port 60a (the voltage between the primary side positive electrode bus line 298 and the primary side negative electrode bus line 299 of the primary side conversion circuit 20), and Vb represents the input/output voltage of the third input/output port 60b (the voltage between the secondary side positive electrode bus line 398 and the secondary side negative electrode bus line 399 of the secondary side conversion circuit 30). $\pi$ represents the circular constant and $\omega$ ($=2\pi \times f=2\pi/T$) represents the angular frequency of the switching of the primary side conversion circuit 20 and the secondary side conversion circuit 30. f represents the switching frequency of the primary side conversion circuit 20 and the secondary side conversion circuit 30, T represents the switching period of the primary side conversion circuit 20 and the secondary side conversion circuit 30, and L represents the equivalent inductance associated with the transmission of electric power of the magnetic coupling reactors 204, 304 and the transformer 400. $F(D, \phi)$ is a function having the duty ratio D and the phase difference φ as parameters and is a parameter monotonously increasing with the increase in the phase difference φ without depending on the duty ratio D. The duty ratio D and the phase difference φ are control parameters designed to vary within a range of predetermined upper and lower limits.

The equivalent inductance L can be defined in an equivalent circuit of the transformer 400 connected to the primary side magnetic coupling reactor 204 and/or the secondary side magnetic coupling reactor 304. The equivalent inductance L is combined inductance obtained by combining leakage inductance of the primary side magnetic coupling reactor 204 and/or the leakage inductance of the secondary side magnetic coupling reactor 304 and the leakage inductance of the transformer 400 in the simple equivalent circuit.

For example, the equivalent inductance L (secondary side converted value $L_{EQ2}$) measured from the secondary side conversion circuit 30 can be expressed by Expression (2), $L_{EQ2}=2L_1(1-k_1)N^2+2L_2(1-k_2)+L_{T2}(1-k_T^2)$.

$L_1$ represents the self inductance of the primary side magnetic coupling reactor 204, $k_1$ represents the coupling coefficient of the primary side magnetic coupling reactor 204, N represents the turns ratio of the transformer 400, $L_2$ represents the self inductance of the secondary side magnetic coupling reactor 304, $k_2$ represents the coupling coefficient of the secondary side magnetic coupling reactor 304, $L_{T2}$ represents the exciting inductance on the secondary side of the transformer 400, and $k_T$ represents the coupling coefficient of the transformer 400. When the second input/output port 60c or the fourth input/output port 60d is not used, the leakage inductance appearing in the first term or the second term in Expression (2) may be absent.

The control unit 50 adjusts the transmission power P by changing the phase difference φ so that the port voltage Vp of at least one port of the primary-ports and the secondary-ports converges on a target port voltage Vo. Accordingly, even when the current consumption of a load connected to the port increases, the control unit 50 can prevent the port voltage Vp from departing from the target port voltage Vo by changing the phase difference φ to adjust the transmission power P.

For example, the control unit 50 adjusts the transmission power P by changing the phase difference φ so that the port voltage Vp of the other port as the transmission destination of the transmission power P out of the primary side ports and the secondary side ports converge on the target port voltage Vo. Accordingly, even when the current consumption of a load connected to the port as the transmission destination of the transmission power P increases, the control unit 50 can prevent the port voltage Vp from departing from the target port voltage Vo by increasing the phase difference φ to adjust the transmission power P.

Figure 4:
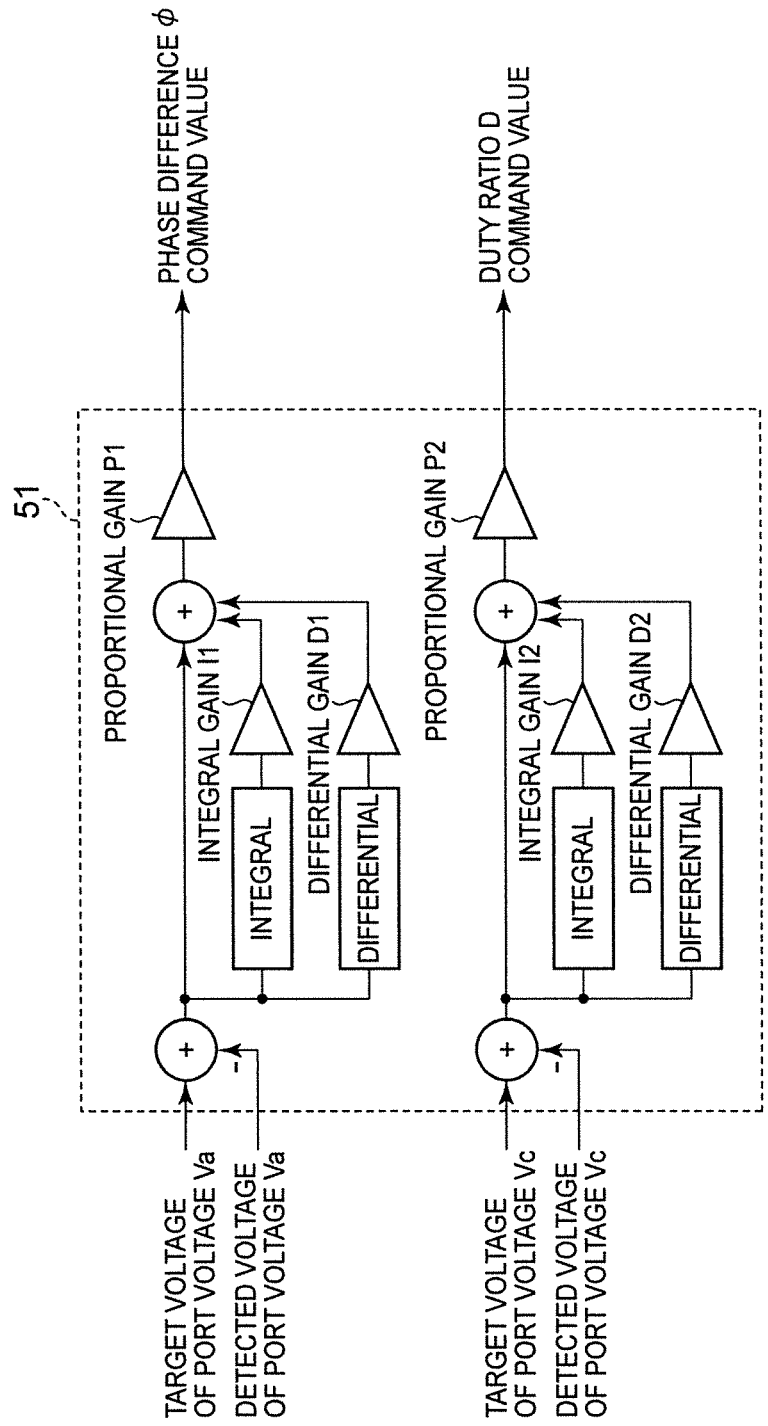
FIG. 4 is a block diagram illustrating a configuration example of a control unit.

FIG. 4 is a block diagram illustrating a configuration example of the control unit 50 for calculating a PID calculated value. The control unit 50 includes a PID control unit 51 and the like. The PID calculated value is, for example, a command value φo of the phase difference φ and a command value Do of the duty ratio D.

The PID control unit 51 includes a phase difference command value generator that generates the command value φo of the phase difference φ for causing the port voltage of at least one port out of the primary side ports and the secondary side ports to converge on the target voltage by PID control for each switching period T. For example, the phase difference command value generator of the PID control unit 51 generates the command value φo for causing the difference to converge on zero for each switching period T by performing the PID control on the basis of the difference between the target voltage of the port voltage Va and the detected voltage of the port voltage Va acquired by the sensor unit 70.

The control unit 50 adjusts the transmission power P determined by Expression (1) by performing the switching control of the primary side conversion circuit 20 and the secondary side conversion circuit 30 on the basis of the command value φo generated by the PID control unit 51 so that the port voltage converges on the target voltage.

The PID control unit 51 includes a duty ratio value generator that generates the command value Do of the duty ratio D for causing the port voltage of at least one port out of the primary side ports and the secondary side ports to converge on the target voltage by the PID control for each switching period T. For example, the duty ratio command value generator of the PID control unit 51 generates the command value Do for causing the difference to converge on zero for each switching period T by performing the PID control on the basis of the difference between the target voltage of the port voltage Vc and the detected voltage of the port voltage Vc acquired by the sensor unit 70.

The PID control unit 51 may include an on-time command value generator generating a command value δo of the on-time δ instead of the command value Do of the duty ratio D.

The PID control unit 51 adjusts the command value φo of the phase difference φ on the basis of an integral gain I1, a differential gain D1, and a proportional gain P1, and adjusts the command value Do of the duty ratio D on the basis of an integral gain I2, a differential gain D2, and a proportional gain P2.

Note that, a relationship of port voltage Va×duty ratio D=port voltage Vc is established among the port voltage Va, the port voltage Vc, and the duty ratio D. Accordingly, when it is wanted to step down the constant port voltage Va (for example, 10 V) to increase the port voltage Vc (for example, from 1 V to 5 V), the duty ratio D can be increased (for example, from 10% to 50%). On the contrary, when it is wanted to step up the constant port voltage Vc (for example, 5 V) to increase the port voltage Va (for example, from 10 V to 50 V), the duty ratio D can be decreased (for example, from 50% to 10%). That is, the PID control unit 51 inverts the control direction of the duty ratio D (the direction in which the duty ratio D increases or decreases) in the step-up operation and the step-down operation by switching the control target (the first input/output port 60a or the second input/output port 60c).

<Relationship Between Transmission Power and Voltage Ratio M>

Herein, the relationship between the transmission power and the voltage ratio M will be described with reference to FIG. 5A, FIG. 5B and FIG. 6A, FIG. 6B.

Figure 5A:
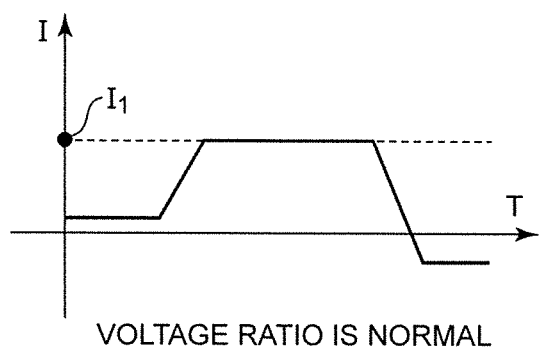
FIG. 5A is a graph illustrating a relationship between transmission power P and a voltage ratio M.
Figure 5B:
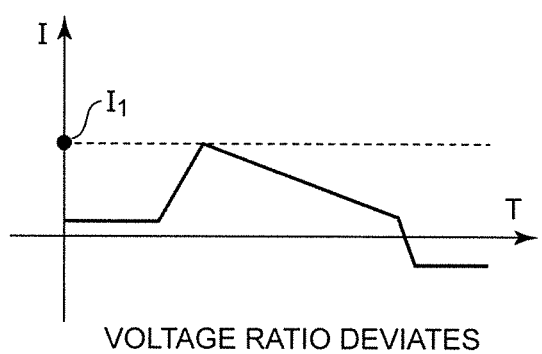
FIG. 5B is a graph illustrating the relationship between the transmission power P and the voltage ratio M.
Figure 6A:
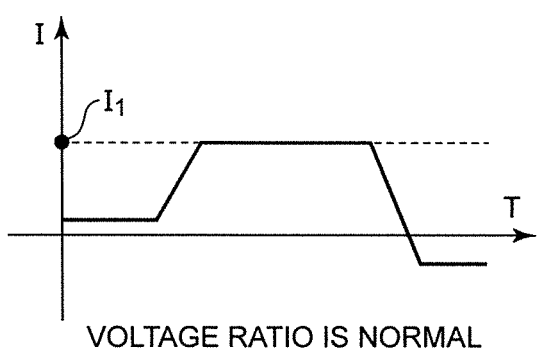
FIG. 6A is a graph illustrating the relationship between the transmission power P and the voltage ratio M.
Figure 6B:
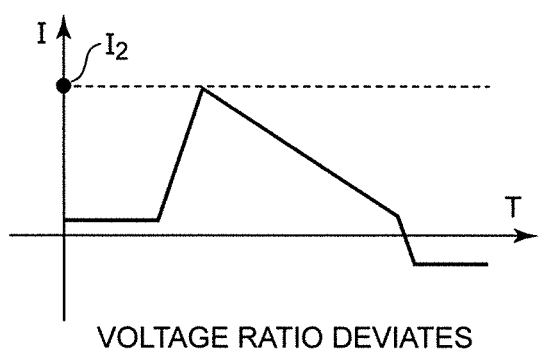
FIG. 6B is a graph illustrating the relationship between the transmission power P and the voltage ratio M.

FIG. 5A and FIG. 6A show a case where the voltage ratio M is normal, while FIG. 5B and FIG. 6B show a case where the voltage ratio M deviates. The horizontal axis represents time T, and the vertical axis represents a current I. Area corresponds to the transmission power P.

When the voltage ratio M is normal, the upper side of the graph is horizontal (see FIG. 5A, FIG. 6A), and when the voltage ratio M deviates, the upper side of the graph is oblique (see FIG. 5B, FIG. 6B).

It is known from FIG. 5A and FIG. 5B that the peak values I1 of the currents I are equal, and the transmission power P when the voltage ratio M is normal is greater than the transmission power P when the voltage ratio M deviates (the area of the graph of FIG. 5A>the area of the graph of FIG. 5B). In other words, since the voltage ratio M deviates, the transmission power P may decrease.

On the other hand, it is known from FIG. 6A and FIG. 6B, the transmission power P is equal (the areas are equal), and the peak value I1 of the current I when the voltage ratio M is normal is less than the peak value I2 of the current I when the voltage ratio M deviates (the peak value I1 in FIG. 6<the peak value I2 in FIG. 6B). In other words, since the voltage ratio M deviates, the peak value of the current I increases even if the transmission power P is equal.

It is known from FIG. 5A, FIG. 5B and FIG. 6A, FIG. 6B, as compared to the case that the voltage ratio M deviates (the voltage ratio M deviates from the reference value by the specified value or more), in the case that the voltage ratio M is normal (the voltage ratio M does not deviate from the reference value by the specified value or more), the transmission power is prone to decrease and the peak current value is prone to increase.

When the transmission power decreases, in order to compensate for the decrease in the transmission power P, it is necessary to perform an excess amount of element design, which increases the cost of the power supply device 101. Further, when the peak current value increases, since the current that flows into the transformer 400, the primary side magnetic coupling reactor 204, the secondary side magnetic coupling reactor 304, the respective arms, and the like increases, it is necessary to enhance ratings of elements and expand sizes of the elements, which increases the cost of the power supply device 101. Therefore, in order to perform a high precision power transmission in the power supply device 101, it is important to maintain the port voltage Vb to be a value within the specified range so that the voltage ratio M does not deviate from the reference value by the specified value or more.

In accordance with the power supply device 101 according to the present embodiment, the control unit 50 causes the step-up/down DC-DC converter 80 that is connected to the third input/output port 60b to operate at a suitable timing (if necessary). Thus, since it is possible to keep the voltage ratio substantially constant even if the voltage on the side of the secondary side high voltage system power supply varies significantly, it is possible to suppress the decrease in the transmission power and the increase in the peak current value, and reduce the cost of the power supply device 101.

Further, the components (for example, a coil component, and the like) used in the step-up/down DC-DC converter 80 that is connected to the third input/output port 60b and the components used in the primary side conversion circuit 20 and the secondary side conversion circuit 30 (for example, a filter L, and the like) can be shared. Thus, it is possible to reduce the labor and cost of adding new components. In addition, it is possible to reduce the current relatively by inserting the step-up/down DC-DC converter to the side of the high voltage system power supply (on the side of the third input/output port 60b). Thereby, since it is possible to suppress the element rating of the step-up/down DC-DC converter itself, the increase in cost can be limited to the minimum degree.

<Operation Flow of Power Supply Device 101>

Figure 7:
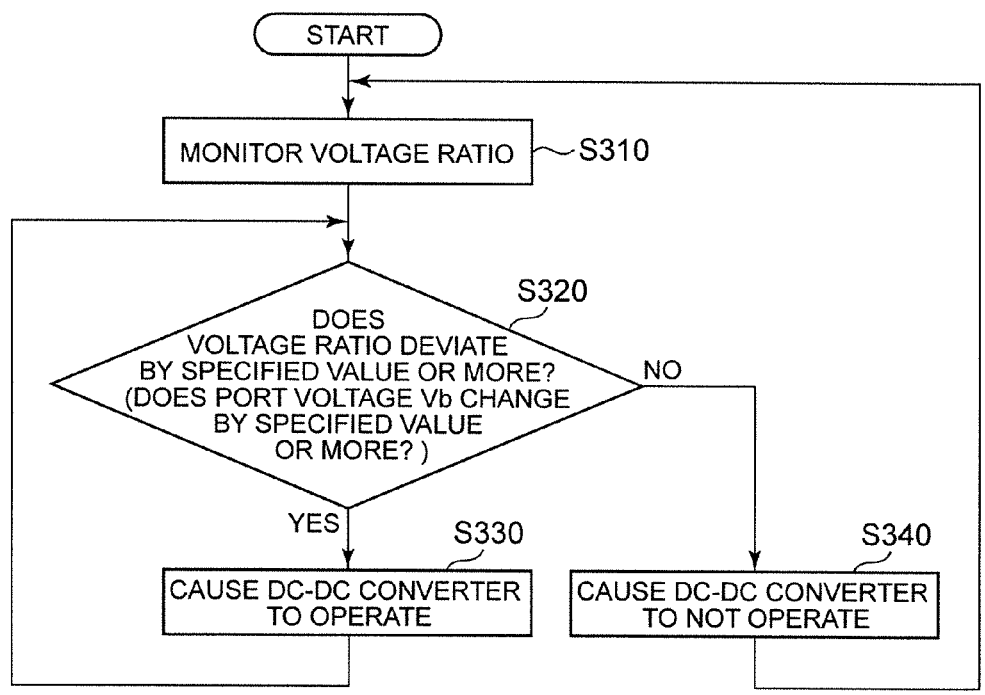
FIG. 7 is a flowchart illustrating an example of a power conversion method.

FIG. 7 is a flowchart illustrating an example of the power conversion method. The power conversion method illustrated in FIG. 7 is performed by the control unit 50.

In step S310, the control unit 50 monitors the voltage ratio M (the ratio of the port voltage Va and the port voltage Vb).

For example, a case that the port voltage Va:the port voltage Vb=50V:300V=1:6 (the reference value of the voltage ratio M=6), and the specified value is ±2 (a deviation rate is ±33%) is considered.

When the port voltage Vb is changed from 300V to 240V, since the port voltage Va:the port voltage Vb=50V: 240V=1: 4.8, the voltage ratio M is 4.8. Since the voltage ratio M is changed from the reference value (=6) by 1.2 (=−4.8), it does not deviate by the specified value (=±2) or more (the deviation rate is (1.2/6)×100=20%). Therefore, there is no need for the control unit 50 to cause the step-up/down DC-DC converter 80 to operate.

When the port voltage Vb is changed from 300V to 420V, since the port voltage Va:the port voltage Vb=50V:420V=1: 8.4, the voltage ratio M is 8.4. Since the voltage ratio M is changed from the reference value (=6) by −2.4 (=6−8.4), it deviates by the specified value (=±2) or more (the deviation rate is (2.4/6)×100=40%). Therefore, there is a need for the control unit 50 to cause the step-up/down DC-DC converter 80 to operate.

In this way, in order to determine whether it is necessary to cause the step-up/down DC-DC converter 80 to operate, the control unit 50 monitors the voltage ratio M based on the detected voltage of the port voltage Va and the detected voltage of the port voltage Vb.

In step S320, the control unit 50 determines whether the voltage ratio M deviates from the reference value by the specified value or more (whether the port voltage Vb varies beyond the specified range). When the voltage ratio M deviates from the reference value by the specified value or more (YES), the control unit 50 performs the processing of step S330. When the voltage ratio M does not deviates from the reference value by the specified value or more (NO), the control unit 50 performs the processing of step S340.

According to the determination in step S320, the control unit 50 can determine whether it is necessary to cause the step-up/down DC-DC converter 80 to operate.

In step S330, the control unit 50 causes the step-up/down DC-DC converter to operate, and then returns to step S320 again. The control unit 50 repeats step S320 and step S330 until the voltage ratio M does not deviate from the reference value by the specified value or more.

In step S340, the control unit 50 causes the step-up/down DC-DC converter to not operate, and returns to step S310 again.

As described above, the control unit 50 monitors the voltage ratio M by the control in step S310, and determines whether the voltage ratio M deviates from the reference value by the specified value or more by the control in step S320. Then, when the voltage ratio M deviates from the reference value by the specified value or more, the control unit 50 causes the step-up/down DC-DC converter to operate by the control in step S330, and when the voltage ratio M does not deviate from the reference value by the specified value or more, the control unit 50 causes the step-up/down DC-DC converter to not operate by the control in step S340. That is, when the voltage of the secondary side port varies greatly, the control unit 50 causes the step-up/down DC-DC converter to operate, to keep the voltage ratio of the voltage of the primary side port and the voltage of the secondary side port substantially constant. Thus, it is possible to suppress the decrease in the transmission power in the power supply device 101.

While the power conversion device and the power conversion method have been described above with reference to the embodiment, the invention is not limited to the aforementioned embodiment. Various modifications and improvements such as combination or replacement of a part or all of other embodiments can be made without departing from the scope of the invention.

For example, in the aforementioned embodiment, a MOSFET as a semiconductor element that is turned on or off has been used as an example of the switching element. However, the switching element may be a voltage-controller power element using an insulating gate such as an IGBT or a MOSFET or may be a bipolar transistor.

A power supply may be connected to the first input/output port 60*a* or a power supply may be connected to the fourth input/output port 60*d*.

The secondary side may be defined as the primary side and the primary side may be defined as the secondary side.

The invention can be applied to a power conversion device that includes three or more input/output ports and that can convert electric power between two input/output ports out of the three or more input/output ports. For example, the invention can be applied to a power supply device having a configuration in which any one input/output port out of four input/output ports illustrated in FIG. 1 is removed.

What is claimed is:

1. A power conversion method of a power conversion device including a primary side port disposed in a primary side circuit and a secondary side port disposed in a secondary side circuit magnetically coupled to the primary side circuit with a transformer, the power conversion device adjusting transmission power transmitted between the primary side circuit and the secondary side circuit by changing a phase difference between switching of the primary side circuit and switching of the secondary side circuit, and changing a voltage of the secondary side port by a DC-DC converter that is connected to the secondary side port, the power conversion method comprising:
monitoring a voltage ratio of a voltage of the primary side port and the voltage of the secondary side port;
determining whether the voltage ratio deviates from a reference value by a specified value or more; and
causing the DC-DC converter to operate when the voltage ratio deviates from the reference value by the specified value or more.

2. The power conversion method according to claim 1, wherein the voltage of the secondary side port is maintained to be a value within a specified range.

3. The power conversion method according to claim 1, wherein the voltage ratio is dependent on the voltage of the secondary side port.

4. The power conversion method according to claim 1, wherein elements included in the DC-DC converter and components included in the primary side circuit and the secondary side circuit are shared.

5. A power conversion device comprising:
a primary side circuit including a primary side port;
a secondary side circuit including a secondary side port and being magnetically coupled to the primary side circuit with a transformer;
a control unit controlling transmission power transmitted between the primary side circuit and the secondary side circuit by changing a phase difference between switching of the primary side circuit and switching of the secondary side circuit; and
a DC-DC converter that is connected to the secondary side port and changes a voltage of the secondary side port,
wherein the control unit is configured to
monitor a voltage ratio of a voltage of the primary side port and the voltage of the secondary side port;
determine whether the voltage ratio deviates from a reference value by a specified value or more; and
cause the DC-DC converter to operate when the voltage ratio deviates from the reference value by the specified value or more.

6. The power conversion device according to claim 5, wherein the voltage of the secondary side port is maintained to be a value within a specified range.

7. The power conversion device according to claim 5, wherein the voltage ratio is dependent on the voltage of the secondary side port.

8. The power conversion device according to claim 5, wherein elements included in the DC-DC converter and components included in the primary side circuit and the secondary side circuit are shared.

* * * * *